United States Patent
Gross

(10) Patent No.: US 6,818,176 B2
(45) Date of Patent: Nov. 16, 2004

(54) OXY-FUELED WASTE INCINERATOR AND METHOD

(75) Inventor: Dietrich M. Gross, Wilmette, IL (US)

(73) Assignee: Jupiter Oxygen Corp., Schiller Park, IL (US)

( * ) Notice: Subject to any disclaimer, the term of this patent is extended or adjusted under 35 U.S.C. 154(b) by 134 days.

(21) Appl. No.: 10/161,020

(22) Filed: Jun. 3, 2002

(65) Prior Publication Data

US 2002/0185791 A1 Dec. 12, 2002

Related U.S. Application Data

(62) Division of application No. 09/843,679, filed on Apr. 27, 2001, now Pat. No. 6,436,337.

(51) Int. Cl.[7] .................................................. F23B 5/00
(52) U.S. Cl. ...................... 266/242; 266/200; 588/900
(58) Field of Search ................................ 266/242, 200; 588/900

(56) References Cited

U.S. PATENT DOCUMENTS

| | | |
|---|---|---|
| 3,547,624 A | 12/1970 | Gray |
| 3,734,719 A | 5/1973 | Estes |
| 3,904,180 A | 9/1975 | Bass |
| 3,955,970 A | 5/1976 | Claxton |
| 4,169,584 A | 10/1979 | Mangalick |
| 4,730,336 A | 3/1988 | Herneisen |
| 4,989,841 A | 2/1991 | Tokumasu |
| RE34,298 E | * 6/1993 | Gitman et al. .................. 431/5 |
| 5,871,343 A | 2/1999 | Baukal |
| 5,883,918 A | 3/1999 | Gubb |
| 5,954,498 A | 9/1999 | Joshi |
| 6,021,723 A | * 2/2000 | Vallomy ..................... 110/203 |
| 6,190,160 B1 | 2/2001 | Hibon |
| 6,418,865 B2 | 7/2002 | Marin |

FOREIGN PATENT DOCUMENTS

DE    0 962 540 A1    9/1998

* cited by examiner

Primary Examiner—Scott Kastler
(74) Attorney, Agent, or Firm—Welsh & Katz, Ltd.

(57) ABSTRACT

An oxygen fueled combustion system includes a furnace having at least one burner, an oxygen supply for supplying oxygen having a predetermined purity, and a carbon based fuel supply for supplying a carbon based fuel. The oxygen and the carbon based fuel are fed into the furnace in a stoichiometric proportion to one another to limit an excess of either the oxygen or the carbon based fuel to less than 5 percent over the stoichiometric proportion. The combustion of the carbon based fuel provides a flame temperature in excess of 4500° F. The exhaust gas stream from the furnace has substantially zero nitrogen-containing combustion produced gaseous compounds from the oxidizing agent and reduced green-house gases. Substantially less carbon based fuel is required than conventional combustion systems without a loss of energy output.

7 Claims, 5 Drawing Sheets

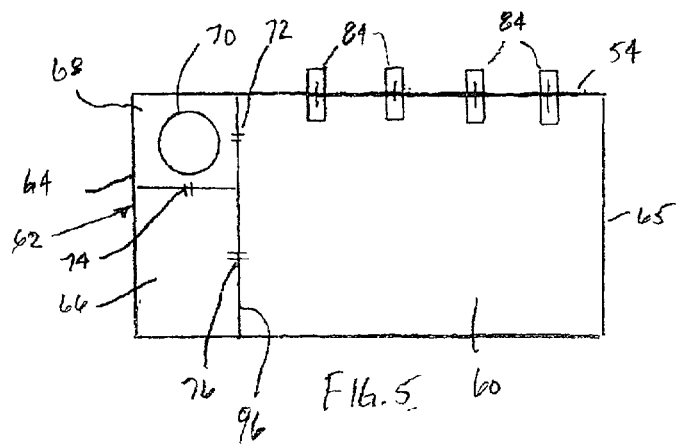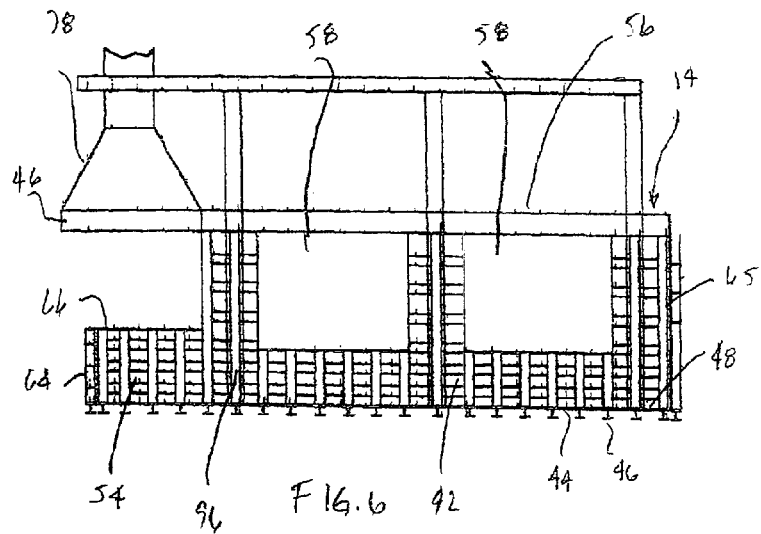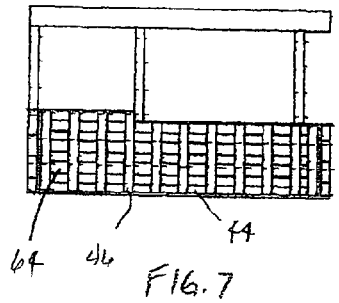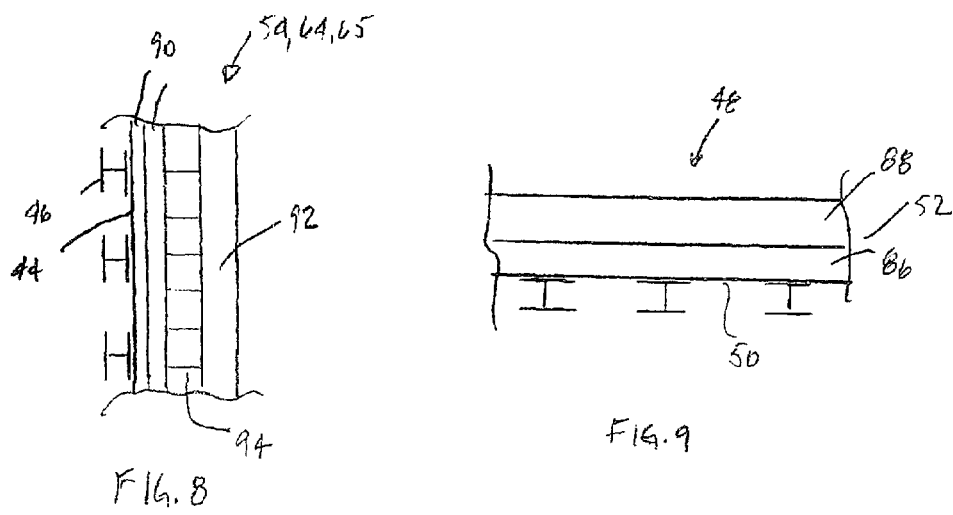

OXY-FUELED WASTE INCINERATOR AND METHOD

CROSS REFERENCE TO RELATED APPLICATIONS

This application is a divisional application of U.S. patent application Ser. No. 09/843,679, filed Apr. 27, 2001 now U.S. Pat. No. 6,436,337.

BACKGROUND OF THE INVENTION

The present invention pertains to an oxygen fueled combustion system. More particularly, the present invention pertains to an oxy-fueled combustion system in which the production of green-house gases is reduced and in which fossil fuel consumption is reduced.

Oxygen fueled burner systems are known, however, their use is quite limited. Oxy-fueled burner systems are generally only used in those applications in which extremely high flame temperatures are required. For example, these systems may be used in the glass making industry in order to achieve the temperatures necessary to melt silica to a fusion temperature. Otherwise, it is commonly accepted that structural and material limitations dictate the upper temperatures to which many industrial systems can be subjected. To this end, air fueled or air fired combustion systems are used in boilers, furnaces and the like throughout most every industrial application including manufacturing, electric power generating and other process applications.

In particular, air fueled combustion systems or electric heating systems are used throughout the steel and aluminum making industries, as well as the power generation industry, and other industries that rely upon carbon based fuels. In air fueled systems, air which is comprised of about 79% nitrogen and 21% oxygen, is fed, along with fuel into a furnace. The air fuel mixture is ignited creating a continuous flame. The flame transfers energy in the form of heat from the fuel air mixture into the furnace.

In the steel and aluminum industries, air fueled furnaces and electric furnaces have been used as the primary heat source for creating molten metals. With respect to air fueled furnaces, it is conventionally accepted that the energy requirements, balanced against the thermal limitations of the process equipment, mandate or strongly support the use of these types of combustion systems. As to the use of electric furnaces in the aluminum industry, again, conventional wisdom supports this type of energy source to achieve the temperatures necessary for aluminum processing.

One drawback to the use of air fueled combustion systems, is that these systems produce NOx and other green-house gases such as carbon dioxide, sulfur dioxide and the like, as an inherent result of the combustion process. NOx and other green-house gases are a large contributor to environmental pollution, including, but not limited to acid rain. As such, the reduction in emission of NOx and other green-house gases is desirable, and as a result of regulatory restrictions, emission is greatly limited. To this end, various devices must be installed on these combustion systems in order to limit and/or reduce the levels of NOx and other green-house gases produced.

Another drawback with respect to air fueled furnaces is that much of the energy released from the combustion process is absorbed or used to heat the gaseous nitrogen present in the air that is fed to the furnace. This energy is essentially wasted in that the heated nitrogen gas is typically, merely exhausted from the heat source, e.g., furnace. To this end, much of the energy costs are directed into the environment, through an off-gas stack or the like. Other drawbacks of the air fed combustion systems known will be recognized by skilled artisans.

Electric furnaces likewise have their drawbacks. For example, inherent in these systems as well is the need for a source of electricity that is available on a continuous basis, essentially without interruption. In that large amounts of electric power are required to operate electric furnaces, it is typically necessary to have these electric furnaces located in proximity to electric generating plants and/or large electrical transmission services. In addition, electric furnaces require a considerable amount of maintenance to assure that the furnaces are operated at or near optimum efficiency. Moreover, inherent in the use of electric furnaces is the inefficiency of converting a fuel into electrical power (most large fossil fueled power stations that use steam turbines operate at efficiencies of less than about 40 percent, and generally less than about 30 percent). In addition, these large fossil fueled stations produce extremely large quantities of NOx and other green-house gases.

For example, in the aluminum processing industry, and more specifically in the aluminum scrap recovery industry, conventional wisdom is that flame temperatures in furnaces should be maintained between about 2500° F. and 3000° F. This range is thought to achieve a balance between the energy necessary for providing sufficient heat for melting the scrap aluminum, and maintaining adequate metal temperatures in the molten bath at about 1450° F. Known furnaces utilize a design in which flame temperatures typically do not exceed 3000° F. to assure maintaining the structural integrity of these furnaces. That is, it is thought that exceeding these temperature limits can weaken the support structure of the furnace thus, possibly resulting in catastrophic accidents. In addition, stack temperatures for conventional furnaces are generally about 1600° F. Thus, the temperature differential between the flame and the exhaust is only about 1400° F. This results in inefficient energy usage for the combustion process.

It is also believed that heat losses and potential damage to equipment from furnaces in which flame temperatures exceed about 3000° F. far outweigh any operating efficiency that may be achieved by higher flame temperatures. Thus, again conventional wisdom fully supports the use of air fueled furnaces in which flame temperatures are at an upper limit of about 3000° F. (by flame stoichiometry) which assures furnace integrity and reduces energy losses.

Accordingly, there exists a need for a combustion system that provides the advantages of reducing environmental pollution (attributable to NOx and other green-house gases) while at the same time providing efficient energy use. Desirably, such a combustion system can be used in a wide variety of industrial applications, ranging from the power generating/utility industry to chemical processing industries, metal production and processing and the like. Such a combustion system can be used in metal, e.g., aluminum, processing applications in which the combustion system provides increased energy efficiency and pollution reduction. There also exists a need, specifically in the scrap aluminum processing industry for process equipment (specifically furnaces) that are designed and configured to withstand elevated flame temperatures associated with such an efficient combustion system and to increase energy efficiency and reduce pollution production.

BRIEF SUMMARY OF THE INVENTION

An oxygen fueled combustion system includes a furnace having a controlled environment, and includes at least one burner. The combustion system includes an oxygen supply for supplying oxygen having a predetermined purity and a carbon based fuel supply for supplying a carbon based fuel. The present oxy fuel combustion system increases the efficiency of fuel consumed (i.e., requires less fuel), produces zero NOx (other than from fuel-borne sources) and significantly less other green-house gases.

The oxygen and the carbon based fuel are fed into the furnace in a stoichiometric proportion to one another to limit an excess of either the oxygen or the carbon based fuel to less than 5 percent over the stoichiometric proportion. The combustion of the carbon based fuel provides a flame temperature in excess of about 4500° F., and an exhaust gas stream from the furnace having a temperature of not more than about 1100° F.

The combustion system preferably includes a control system for controlling the supply of carbon based fuel and for controlling the supply of oxygen to the furnace. In the control system, the supply of fuel follows the supply of oxygen to the furnace. The supply of oxygen and fuel is controlled by the predetermined molten aluminum temperature. In this arrangement, a sensor senses the temperature of the molten aluminum.

The carbon based fuel can be any type of fuel. In one embodiment, the fuel is a gas, such as natural gas, methane and the like. Alternately, the fuel is a solid fuel, such as coal or coal dust. Alternately still, the fuel is a liquid fuel, such a fuel oil, including waste oils.

In one exemplary use, the combustion system is used in a scrap aluminum recovery system for recovering aluminum from scrap. Such a system includes a furnace for containing molten aluminum at a predetermined temperature, that has at least one burner. The recovery system includes an oxygen supply for supplying oxygen to the furnace through the combustion system. To achieve maximum efficiency, the oxygen supply has an oxygen purity of at least about 85 percent.

A carbon based fuel supply supplies a carbon based fuel. The oxygen and the carbon based fuel are fed into the furnace in a stoichiometric proportion to one another to limit an excess of either the oxygen or the carbon based fuel to less than 5 percent over the stoichiometric proportion. The combustion of the carbon based fuel provides a flame temperature in excess of about 4500° F., and an exhaust gas stream from the furnace having a temperature of not more than about 1100° F.

In such a recovery system, the combustion of oxygen and fuel creates energy that is used for recovering aluminum from the scrap at a rate of about 1083 BTU per pound of aluminum recovered. The fuel can be a gas, such as natural gas, or it can be a solid fuel or a liquid fuel.

In the recovery system, heat from the furnace can be recovered in a waste heat recovery system. The recovered heat can be converted to electrical energy.

In a most preferred system, the combustion system includes a system for providing oxygen. One such system separates air into oxygen and nitrogen, such as a cryogenic separation system. Other systems include membrane separation and the like. Oxygen can also be provided by the separation of water into oxygen and hydrogen. In such systems, the oxygen can be stored for use as needed. Other systems are known for oxygen generation/separation.

The oxygen fueled combustion system, generally, can be used with any furnace that has a controlled environment. That is, with any furnace that has substantially no in-leakage from an external environment. Such a combustion system includes an oxygen supply for supplying oxygen having a predetermined purity and a carbon based fuel supply for supplying a carbon based fuel.

The oxygen in the oxygen supply and the carbon based fuel are fed into the furnace in a stoichiometric proportion to one another to limit an excess of either the oxygen or the carbon based fuel to less than 5 percent over the stoichiometric proportion. In such a furnace, an exhaust gas stream from the furnace has substantially zero nitrogen-containing combustion produced gaseous compounds. That is, because there is no nitrogen fed in with the fuel, unless there is fuel-borne nitrogen, the exhaust gas contains substantially no nitrogen containing combustion products (i.e., NOx), and significantly lowered levels of other green-house gases.

This combustion system can use any carbon based fuel including gas, such as natural gas or methane, any solid fuel such as coal or coal dust or any liquid fuel, such as oil, including waste and refined oils. In such a combustion system, any nitrogen-containing combustion produced gaseous compounds are formed from the fuel-borne nitrogen.

A method for recovering aluminum from scrap includes feeding aluminum scrap into a melting furnace and combusting oxygen and a carbon based fuel in the furnace. In the combustion of the oxygen and fuel, the oxygen and fuel are fed into the furnace in a stoichiometric proportion to one another to limit an excess of either the oxygen or the carbon based fuel to less than 5 percent over the stoichiometric proportion. The combustion provides a flame temperature in excess of about 4500° F., and an exhaust gas stream from the furnace having a temperature of not more than about 1100° F.

The aluminum is melted in the furnace, contaminant laden aluminum is removed from the furnace and substantially pure molten aluminum is discharged from the furnace. The method can include the step of recovering aluminum from the contaminant laden aluminum, i.e., dross, and charging the recovered aluminum into the furnace.

The method can include recovering waste heat from the furnace. The waste heat recovered can be converted to electricity.

A furnace for recovering aluminum from scrap aluminum includes a bath region for containing molten aluminum at a predetermined temperature, and at least one burner. An oxygen supply supplies oxygen having a purity of at least about 85 percent and a carbon based fuel supply supplies fuel, such as natural gas, coal, oil and the like.

The oxygen in the oxygen supply and the fuel are fed into the furnace in a stoichiometric proportion to one another to limit an excess of either the oxygen or the fuel to less than 5 percent over the stoichiometric proportion. The combustion of the fuel provides a flame temperature in excess of about 4500° F., and an exhaust gas stream from the furnace has a temperature of not more than about 1100° F.

In one embodiment, the furnace is formed from steel plate, steel beams and refractory materials. The furnace walls are configured having a steel beam and plate shell, at least one layer of a crushable insulating material, at least one layer of a refractory brick, and at least one layer of a castable refractory material. The furnace floor is configured having a steel beam and plate shell and at least two layers of refractory material, at least one of the layers being a castable refractory material.

A salt-less method for separating aluminum from dross-laden aluminum is also disclosed that includes the steps of introducing the dross-laden aluminum into a furnace. The furnace has an oxygen fuel combustion system producing a flame temperature of about 5000° F., and having substantially no excess oxygen. The dross-laden aluminum melts within the furnace.

An upper portion of the melted dross-laden aluminum is skimmed to produce a heavily dross-laden product. The heavily dross-laden product is pressed in a mechanical press to separate the aluminum from the heavily dross-laden product to produce a concentrated heavily dross-laden product. The method can include the step of returning the concentrated heavily dross-laden product to the furnace. Introduction of the dross-laden aluminum into the furnace is carried out in near direct flame impingement to release the oxides from the dross.

These and other features and advantages of the present invention will be apparent from the following detailed description, in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein:

FIG. 5 is a schematic illustration of an aluminum melting furnace for use with an oxygen fueled combustion system in accordance with the principles of the present invention;

FIG. 6 is a side view of the furnace of FIG. 5;

FIG. 7 is a front view of the melting furnace of FIG. 6;

FIGS. 8 and 9 are partial cross-sectional illustrations of a side wall and the floor of the furnace, respectively;

DETAILED DESCRIPTION OF THE INVENTION

Figure 1:
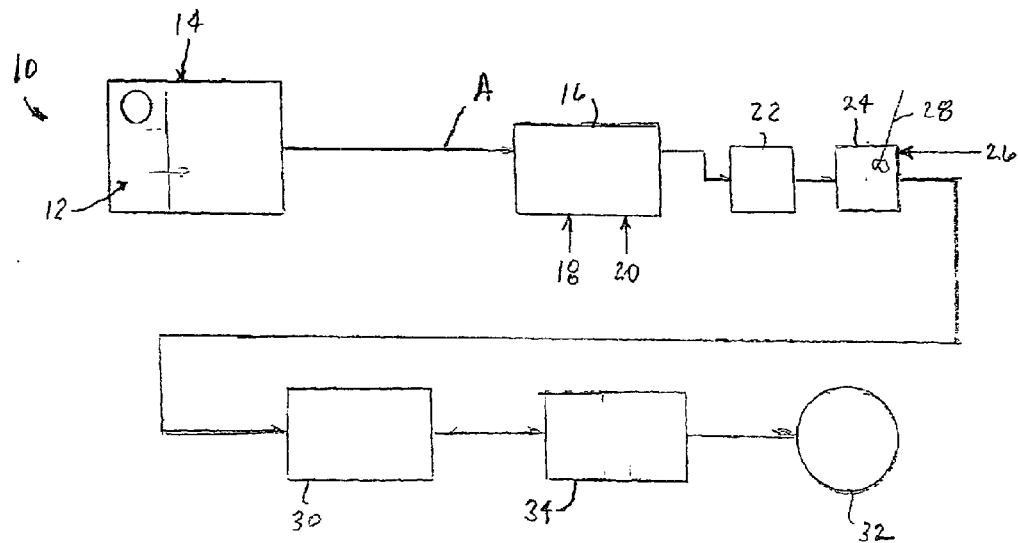
FIG. 1 is an overall flow scheme of an exemplary aluminum scrap recovery process having a melting furnace with an oxygen fueled combustion system, in which green-house gas production and fuel consumption are reduced, embodying the principles of the present invention.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated. It should be further understood that the title of this section of this specification, namely, "Detailed Description Of The Invention", relates to a requirement of the United States Patent Office, and does not imply, nor should be inferred to limit the subject matter disclosed herein.

An oxy-fuel combustion system uses essentially pure oxygen, in combination with a fuel source to produce heat, by flame production (i.e., combustion), in an efficient, environmentally non-adverse manner. Oxygen, which is supplied by an oxidizing agent, in concentrations of about 85 percent to about 99+ percent can be used, however, it is preferable to have oxygen concentration (i.e., oxygen supply purity) as high as possible. In such a system, high-purity oxygen is fed, along with the fuel source in stoichiometric proportions, into a burner in a furnace. The oxygen and fuel is ignited to release the energy stored in the fuel. For purposes of the present disclosure, reference to furnace is to be broadly interpreted to include any industrial or commercial heat generator that combusts fossil (carbon-based) fuels. In a preferred system, oxygen concentration or purity is as high as practicable to reduce green-house gas production.

It is contemplated that essentially any fuel source can be used. For example, in a present application, as will be described in more detail below, oxygen is fed along with natural gas, for combustion in a furnace. Other fuel sources contemplated include oils including refined as well as waste oils, wood, coal, coal dust, refuse (garbage waste) and the like. Those skilled in the art will recognize the myriad fuel sources that can be used with the present oxy-fuel system.

The present system departs from conventional processes in two principal areas. First, conventional combustion processes use air (as an oxidizing agent to supply oxygen), rather than essentially pure oxygen, for combustion. The oxygen component of air (about 21 percent) is used in combustion, while the remaining components (essentially nitrogen) are heated in and exhausted from the furnace. Second, the present process uses oxygen in a stoichiometric proportion to the fuel. That is, only enough oxygen is fed in proportion to the fuel to assure complete combustion of the fuel. Thus, no "excess" oxygen is fed into the combustion system.

Many advantages and benefits are achieved using the present combustion system. It has been observed, as will be described below, that fuel consumption, to produce an equivalent amount of power or heat is reduced, in certain applications, by as much as 70 percent. Significantly, this can provide for a tremendous reduction in the amount of pollution that results. Again, in certain applications, the emission of NOx can be reduced to essentially zero, and the emission of other green-house gases reduced by as much as about 70 percent over conventional air-fueled combustion systems.

An Exemplary Scrap Aluminum Recovery Process

Figure 2:
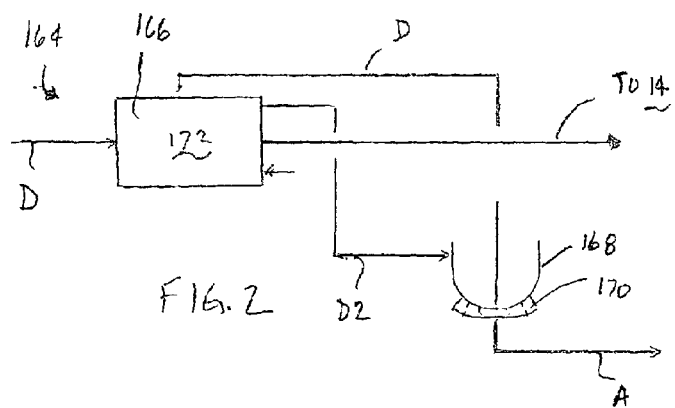
FIG. 2 is an overall flow scheme of a dross processing operation continued from FIG. 1 having a recovery furnace having an oxygen fueled combustion system embodying the principles of the present invention.

In one specific use, the oxygen fueled combustion system (also referred to as oxy-fuel or oxy-fueled) is used in a scrap aluminum recovery plant 10. A flow process for an exemplary plant is illustrated in FIGS. 1–2. Scrap aluminum, generally indicated at 12 is fed into a melting furnace 14, and is liquefied. The plant 10 can include multiple furnaces operated in parallel 14, one of which is illustrated. The liquefied or molten aluminum is drawn from the melting furnace 14 and is fed into a smaller holding furnace or holder 16. The holding furnace 16 is also an oxy-fueled furnace. The molten aluminum is drawn from the melting furnace 14 as necessary, to maintain a certain, predetermined level in the holding furnace 16. This can result in continuously drawing down from the melting furnace 14 or drawing down in "batches" as required.

In the holding furnace 16, chlorine and nitrogen (as gas), as indicated at 18 and 20, respectively, are fed into the holding furnace 16 to facilitate drawing the impurities from the molten aluminum. The chlorine and nitrogen function as a gaseous fluxing agent to draw the impurities from the aluminum. This can also be carried out in the melting furnaces 14 to increase cleaning of oily and dirty scrap. Other contemplated fluxing agents include gaseous argon hexafluoride. The holder 16 is actively heated and operates at a molten metal temperature of about 1300° F. The air temperature in the holder 16 is slightly higher.

The molten aluminum is then filtered. Presently, a bag-type particulate filter 22 is used. However, other types of filters are known and can be used. The filtered, molten aluminum is then fed through a degasser 24.

In the degasser 24, a fluxing agent, such as an inert gas (again, nitrogen is used, as indicated at 26) is fed into the molten aluminum. The molten aluminum is agitated, such as by a mechanical stirrer 28 and the fluxing agent 26 bubbles up through the molten aluminum to draw impurities (e.g., oxides) from the aluminum.

The molten aluminum is then fed into an in-line caster 30. In the caster 30, the aluminum is cast into continuous plate. The cast thickness can be any where from 0.010 inches up to 0.750 inches or more. The aluminum can then be rolled into a coil, as indicated at 32, for use or further processing. In a present method, the aluminum proceeds from the caster 30 through a pair of hot milling machines 34 where the plate is milled to a final thickness or gauge, presently about 0.082 inches (82 mils) and is then rolled to form the coil 32. Those skilled in the art will understand and appreciate the various end forming and finishing processes that can be carried out on the metal. All such forming and finishing processes are within the scope and spirit of the present invention.

Returning to the melting furnace 14, as stated above, it is an oxy-fuel furnace. It is fed with a carbon based fuel, such as natural gas, in stoichiometric proportion with oxygen. This is unlike known furnaces which use fuel and air mixtures. The fuel/air mixtures feed nitrogen as well as oxygen into the furnace to support the combustion process. This results in the production of undesirable NOx off-gases. In addition, the nitrogen also absorbs energy from the molten aluminum, thus reducing the overall efficiency of the process. That is, because the percentage of nitrogen in air is so great, a large amount of energy goes into heating the nitrogen rather than the aluminum.

The oxygen/natural gas proportions in the present melting and holding furnaces 14, 16 are about 2.36:1. This ratio will vary depending upon the purity of the oxygen supply and the nature of the fuel. For example, under perfect conditions of 100 percent pure oxygen, the ratio is theoretically calculated to be 2.056:1. However, the oxygen supply can have up to about 15 percent non-oxygen constituents and natural gas is not always 100 percent pure. As such, those skilled in the art will appreciate and understand that the ratios may vary slightly, but the basis for calculating the ratios, that is stoichiometric proportions of fuel and oxygen, remains true.

This proportion of oxygen to fuel provides a number of advantages. First, this stoichiometry provides complete combustion of the fuel, thus resulting in less carbon monoxide, NOx and other noxious off-gas emissions (other green-house gases generally). In addition, the controlled oxygen proportions also reduce the amount of oxides present in the molten aluminum. This, in turn, provides a higher quality final aluminum product, and less processing to remove these undesirable oxide contaminants.

It is important to note that accurately controlling the ratio of oxygen to fuel assures complete burn of the fuel. This is in stark contrast to, for example, fossil fueled power plants (e.g., utility power plants), that struggle with LOI (loss on ignition). Essentially, LOI equates to an incomplete burn of the fuel. In the present method, on the other hand, substantially pure oxygen, in tightly controlled stoichiometric proportion to the fuel, minimizes and possibly eliminates these losses. In addition, in the present method, the only theoretical NOx available is from fuel-borne NOx, rather than that which could otherwise result from combustion using air. Thus, NOx, if not completely eliminated is reduced to an insignificant amount compared to conventional combustion systems.

Oxides in aluminum come from two major sources. First, from the combustion process; second, from oxides that reside in the aluminum. This is particularly so with poor grade scrap or primary metal. The present process takes into consideration both of these sources of oxides and reduces or eliminates their impact on the final aluminum product. First, the present process reduces oxides that could form as a result of the oxygen fed for the combustion of the fuel. This is achieved by tightly controlling oxygen feed to only that necessary by stoichiometric proportion for complete combustion of the fuel.

The present process takes into consideration the second sources of oxides (that residing in the aluminum), and removes these oxides by virtue of the degassing and filtering processes. The benefits are two fold. The first is that less byproduct in the form of dross D is formed; second, the quality of the finished product is greatly enhanced.

It has also been found that using a fuel/oxygen mixture (again, rather than a fuel/air mixture) results in higher flame temperatures in the melting furnace. Using oxy-fuel, flame temperatures in the furnace of about 5000°F. are achieved. This is higher, by about 1500° F. to 2000° F., than other, known furnaces. It has also been observed that using oxy-fuel, in conjunction with these higher flame temperatures, results in an extremely highly efficient process. In one measure of efficiency, the energy required (in BTU) per pound of processed aluminum is measured. In a known process, the energy required is about 3620 BTU/lb of processed product. In the present process and apparatus, the energy requirements are considerably less, about 1083 BTU/lb of metal processed. It should also be noted that although the "fuel" discussed above in reference to the present method is natural gas, any organic based fuel, such as oil (including waste oil), coal, coal dust and the like can be used.

For purposes of understanding the thermodynamics of the process, the theoretical energy required to melt a pound of aluminum is 504 BTUs. However, because specific process inefficiencies are inherent, the actual energy required was found to be about 3620 BTU/lb when using an air fired combustion system. These inefficiencies include, for example, actual processing periods being less than the actual time that the furnace is "fired", and other downstream process changes, such as caster width increases or decreases. In addition, other "losses" such as stack (heat) losses, and heat losses through the furnace walls, add to this energy difference.

Moreover, the value of 1083 BTU/lb is an average energy requirement, even taking into account these "losses". It has been found that when the process is running at a high efficiency rate, that is when aluminum is processed almost continuously, rather than keeping the furnace "fired" without processing, the "average" energy requirement can be reduced to about 750BTU/lb to 900BTU/lb.

The Melting Furnace

A present melting furnace 14 is constructed primarily of steel and refractory materials. Referring to FIGS. 5–9, the furnace shell 42 has outside dimensions of about 20 feet in width by 40 feet in length by 12 feet in height. The steel shell structure 42 is formed from plates and beams. Plates and beams will be identified through as 44 and 46, respectively, for the furnace shell 42 structure, except as indicated. The floor 48 is fabricated from one-inch thick plate 44 steel that is welded together. Each weld is above a beam 46 to assure the integrity of the furnace shell 42.

Additional beams 46 are provided for furnace floor 48 support. Each beam 46 provides an 8 inch wide flange about every 18 inches on center. All of the beams 46 (exclusive of the joining beams which are completely seam welded) are stitched to the bottom plate 50. This permits "growth" in the steel due to thermal expansion during heating.

The beams 46 provide support and rigidity to the furnace bottom 52. The beams 46 maintain the furnace 14 rigid to reduce flexing during installation of the refractory and long-term use. The beams 46 also provide support so that during operation of the furnace 14 the mechanical loading on the refractory materials is minimized. The beams 46 also elevate the furnace bottom 52 from the floor on which the furnace 14 is mounted. This allows heat, which builds up under the furnace 14, to escape.

The furnace side walls 54 are likewise made of a steel plate and beam construction. Two wall regions are recognized, above metal line and below metal line. This distinction is made for both strength and thermal value considerations.

Below metal line, the plate is ¾ inch thick. Above metal line, the plate is ⅝ inch thick. In the present furnace, the first eight feet are considered (for design purposes) below metal line and the upper four feet are considered (for design purposes) above metal line.

Beams 46 are used to support the side walls 54 of the furnace 14. The beams 46 are set on 18 inch centerlines running vertically along the furnace 14. Horizontal beams 46 are placed at 18 inch centers below metal line and 24 inch centers above metal line. Although the metal line in the furnace 14 varies, it is, for design considerations, the highest level of metal that will be in the furnace 14 during normal operation. Additional factors may be considered, in which, for example, the metal line can be assumed to be nine inches above the maximum fill line of the furnace 14.

The roof 56 of the furnace 14 is a hanging refractory design. Beams 46 are on 18 inch centers along the width of the furnace 14. Additional beams 46 are welded to beams extending across the width, which additional beams are oriented along the length of the furnace 14. Clips are mounted to the beams, to which precast refractory blocks are mounted.

The furnace 14 has two main doors 58 on the furnace side 54. The doors 58 are used during operation for skimming or cleaning the main furnace heat chamber or bath area 60 and for main furnace chamber 60 charging. Dross D (the contaminant slag that forms of the surface of molten aluminum) builds up inside the furnace 14 and must be cleaned out at least once a day to maintain heat transfer rates. The dross D is removed by opening the doors 58 and skimming the surface of the molten metal pool.

Although during typical operation, metal or scrap is placed in the charge well 62, and is subsequently melted and transferred to the furnace heat chamber 60, some types of scrap, such as sows or ingot, are better placed directly in the main heat chamber 60. The doors 58 can be opened to transfer these types of loads to the heat chamber 60.

The doors 60 are of steel and refractory construction. The doors 60 are hung on a mechanical pulley system (not shown) and are protected by safety chains to prevent them from falling to the ground in the event that the pulley system fails. Powered winches are used to operate the doors. The doors 60 are hung from a common cross member, which is supported from the side 54 of the furnace 14.

The main charge well 62 is located on the front 64 of the furnace 14. The well 62 is partitioned from the furnace heat chamber 60 and is partitioned into two areas: a charging area 66; and a circulation pump area 68. A circulation pump 70 circulates metal from the hot pool of molten aluminum in the main chamber 60 to the scrap charging area 62.

There are three openings, indicated at 72, 74 and 76, between the chambers 60, 66 and 68. The first opening 72 is in the partition between the main chamber 60 and the pump well 68. The second opening 74 is in the partition between the pump well 68 and the scrap charging area 66. The third opening 76 is in the partition between the charge well 66 and the main heat chamber 60.

All of the openings 72, 74 and 76 are about one foot below the physical or actual metal line of the furnace 14. The openings 72, 74 and 76 are below metal line to maintain the heat inside the main chamber 60, and to prevent the flow of oxides between the partitioned areas of the furnace 14 and to maintain the furnace air-tight (i.e., maintain a controlled environment within the furnace 14). The pump 70 is located in an elevated area to prevent excessive furnace garbage, rocks and dross from accumulating in and around the pump 70.

An exhaust hood 78 is positioned above the charge chamber 66. The hood 78 is fabricated from steel and is mounted on beams 46 similar to those from which the side walls 54 are fabricated. The beams 46 are positioned on a plate that covers the side wall of the well, essentially capping it off. The hood 78 vents the main furnace chamber 60 through a stack 80 (see FIG. 4). The stack 80 exhausts gases from the furnace 14 and can be closed off to maintain pressure in the furnace 14.

Figure 4:
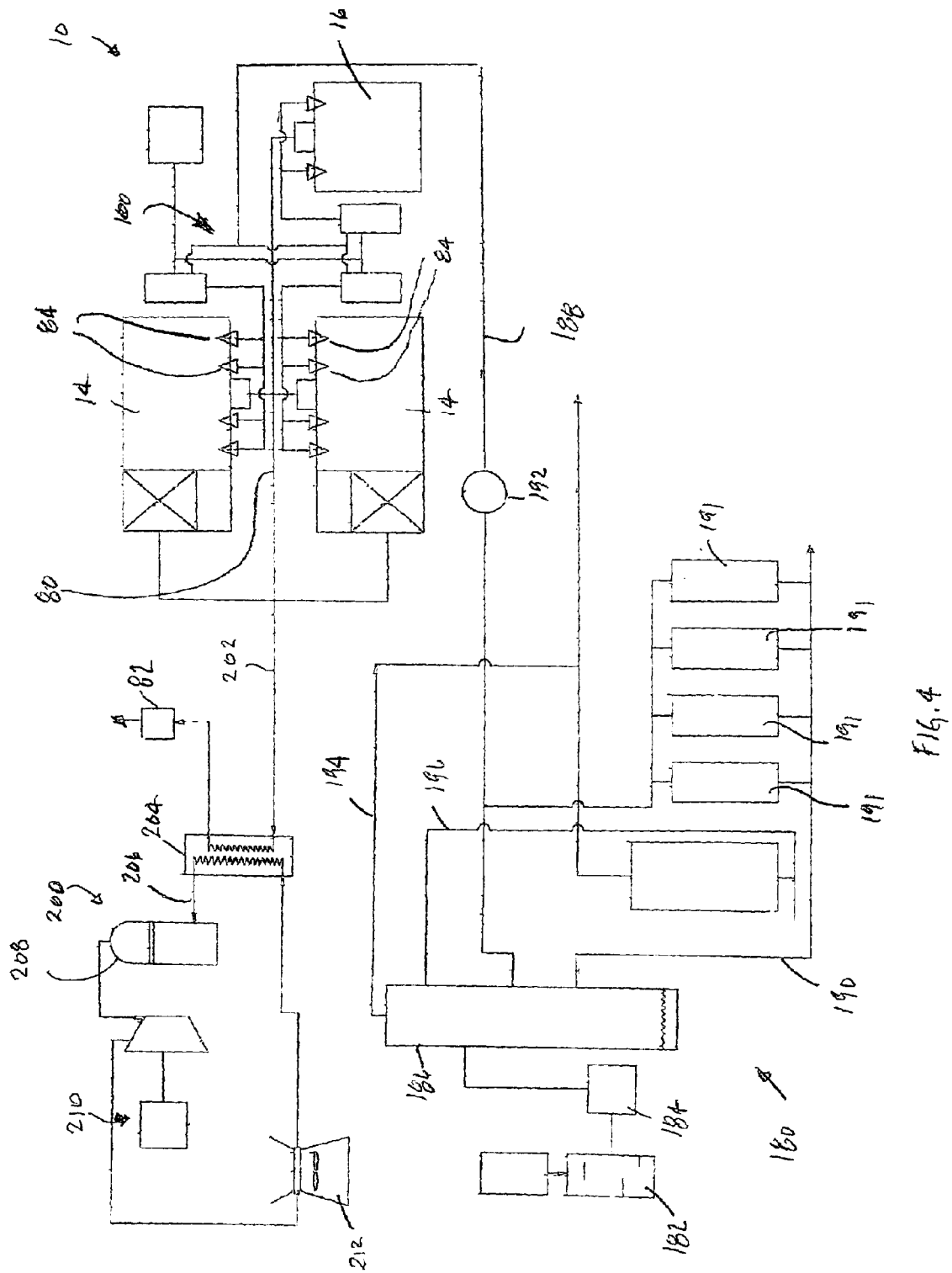
FIG. 4 is an overall plant scheme showing the oxygen supply, from a cryogenic plant, and flow to the furnaces, and further illustrating an exemplary waste heat recovery plant.

Exhaust gases exit the furnace 14 and flow to a baghouse 82 (FIG. 4). The baghouse 82 is used primarily for collection of unburned carbon from paints, oils, solvents and the like inherent in scrap aluminum processing.

The furnace 14 includes four oxy-fuel burners 84. The burners 84 are installed on a side wall 54 of the furnace 14, opposite the doors 58. Steel is constructed surrounding the burners 84 to allow for mounting the burners 84 and maintaining the surrounding wall rigid.

The furnace 14 is lined with refractory materials. The floor 48 is fabricated from two different refractory materials. The first material 86 is a poured slab, about six inches thick, of a high strength, castable refractory, such as AP Green KS-4, that forms a sub hearth. A floor material 88 is poured above the sub hearth 86 in monolithic fashion having a thickness of about thirteen to fourteen inches. The floor material 88 is an AP Green 70AR refractory. It is a 70 percent alumina, aluminum resistant castable refractory.

The walls 54, 64 and 65 are fabricated from two layers of insulation 90 followed by the 70 AR castable or monolithic, phosphate bonded 85 percent alumina (MONO P85) plastic ramming refractory 92. The alumina content of this material is 85 percent. The backing insulation 90 is insulating board, about two inches thick in the side walls 54 of the furnace and about three inches thick on the front and rear walls 64, 65 of the furnace. The difference in insulation 90 thickness is to accommodate thermal expansion of the furnace 14. The furnace walls 54, 64 and 65 will grow about ⅛ inch per linear foot. Thus, the furnace 14 will grow (along the 40 foot length) a total of about 5 inches. In that there is six inches of backing insulation 90 (each the front and rear has three inches), the insulation 90 will crush and allow for growth in the furnace walls 54, 64 and 65 without damaging the furnace shell 42.

Insulating brick 94 is positioned between the crushable insulation board 90 and the cast refractory 92. The roof 56 is fabricated from 70 percent alumina castable refractory. The material is poured into six roof sections. Each door 58 frame is fabricated from 70 percent alumina AR refractory.

The furnace 14 has two sets of tap out blocks (not shown). The first set is positioned on the bottom 52 of the furnace and serve as drain blocks. A second set of blocks is positioned sixteen inches from the floor of the furnace and serves as a transfer set of blocks. The transfer blocks are set on the outside of the furnace for ease of replacement. The inside of the furnace is formed and the blocks are set on the outside and keyed in with a plastic ram.

There are two ramps (not shown) in the furnace, one at each of the main charge doors 58. The ramps are used for deslagging or skimming dross D from the molten metal and for allowing scrap aluminum to slide into the furnace. The ramps are composed of two materials. The base is a low grade aluminum resistant brick, stacked to form a ramp. The brick is covered with a castable refractory (about 18 inches thick), such as the 70AR material. The ramp extends from the edge of the sill into the furnace.

The wall 96 that separates the main furnace chamber 60 and the charge well 62 is about 22 inches thick and is formed from 70AR material. The wall 96 is cast as a single monolithic structure.

The furnace 14 can operate in several modes from empty to holding and maintaining molten aluminum. When the furnace 14 is at peak operation it is about 80 percent to 90 percent full. The molten metal is at about 1400° F. and the air temperature in the furnace is about 1800° F. The stack (exhaust) temperature is about 1000° F. Air temperature is measured by a thermocouple 98 in the upper side wall 54 of the furnace 14. Metal temperature is measured at the base of the circulating pump 70.

Scrap is charged or introduced to the furnace in the charge well 62 in increments of about 3,000 pounds. It will be understood that the size or weight of the introduced scrap will vary depending upon the size and capacity of the furnace 14.

Molten metal from the main chamber 60 is pumped onto the cool metal charge by the circulation pump 70. The molten metal transfers heat, by conductivity, to the cold metal charge. The charge metal rapidly heats and melts.

The primary mode of heat transfer to the charged aluminum is by conduction. The large heat sink provided by the full furnace enhances this effective method of heat transfer. When the furnace is 80 percent to 90 percent of capacity there is about 220,000 pounds of molten aluminum at about 1400° F. When scrap is charged into the furnace 14 the bath acts as a heat sink and provides the necessary energy for heat transfer to the charged metal. This is true regardless of the dimensions and capacity of the furnace, as adapted to the present oxy-fuel combustion system. The circulating pump 70 assists melt of the scrap by providing hot molten metal to the charge well 62 from the main furnace chamber 60. In addition, by circulating the molten metal, heat stratification throughout the furnace 14 is maintained low.

It has been found that by pumping or circulating the molten metal, the temperature differential between the top and the bottom of the furnace 14 (a height difference of about 42 inches) is only a few degrees Fahrenheit. Thus, the furnace 14 acts as a stable heat sink to provide a consistent heat source for conduction heat transfer to the charge metal.

Heat is input to the furnace 14 by the burners 84. It is believed that the principal mode of heat transfer to the furnace 14 is radiation, with some convective heat transfer. Because of the high flame temperatures, the oxy fuel combustion system provides efficient radiative heat transfer. The geometry of the furnace 14 is further designed to increase the heat transfer rate by maximizing the metal surface area over which heat transfer from the flame to the metal occurs.

In addition, the refractory materials above the metal line are made of a high alumina content material. These materials reflect the heat from the burners back into the molten metal. This is in contrast to conventional furnace designs which, rather than reflecting heat back into the molten metal pool, permit much of the heat to escape from the furnace.

For example, traditional furnaces use refractories that have a lower alumina content and a higher insulation value on the upper side walls. The present design, on the other hand, uses higher alumina content refractories in order to reflect more of the radiative heat from the burners 84 to the bath area 60. Again, this is contrary to conventional furnace design. In traditional furnaces the lower side walls (defined as below metal line) use higher alumina refractories for strength. In contrast, the present design uses a lower alumina castable refractory, which is more advanced and has a higher insulating value. In a sense the present design goes completely against the traditional application of refractories.

Moreover, because there is no nitrogen fed to the furnace 14 (other than fuel-borne nitrogen) the volume of hot gases (e.g., exhaust) going through the furnace 14 is very low. Advantageously, this increases the residence time of the gases in the furnace 14 providing additional opportunity for heat transfer to the molten metal. Convective heat transfer, while relatively low, is more efficient than in conventional furnaces. In that the hot gases in the present furnace 14 approach 5000° F. and have a relatively long residence time, much of the heat is removed prior to exhaust.

A present furnace 14 operates at an energy input required to melt of about 1083 BTU per pound. The maximum heat input to the furnace 14 is about 40 million BTU (40 MMBTU) per hour, and typical heat input is about 10 to 12 MMBTU per hour. The heat input will, of course, depend upon the scrap being melted and the production requirements. The furnace is capable of melting up to 40,000 pounds per hour.

The Combustion System

Figure 3:
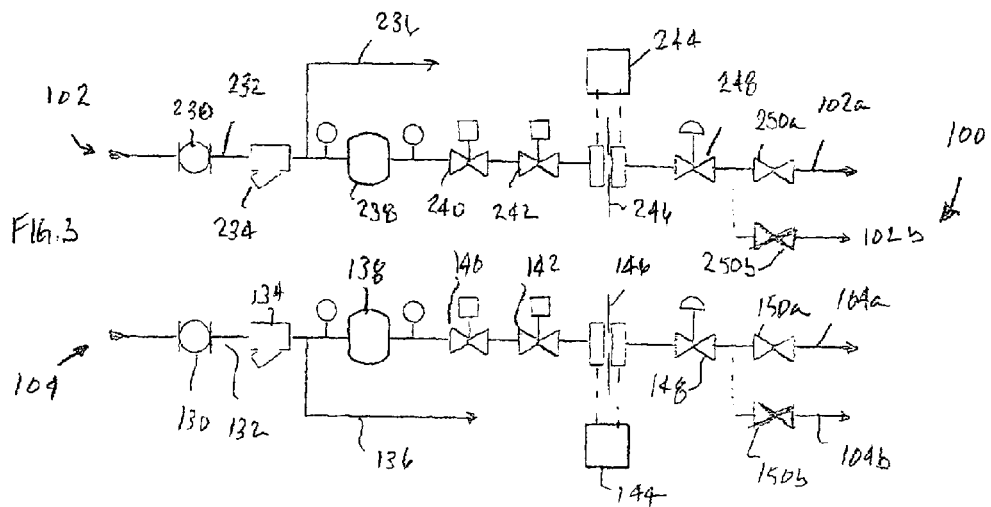
FIG. 3 is an exemplary natural gas supply train and oxygen supply train for use with the oxygen fueled combustion system.

The combustion system, indicated in FIG. 3, generally at 100, is a dual combustion train that operates on a fuel, such as natural gas, fuel oil, waste oil, coal (pulverized, dust and liquefied), and an oxygen source. The system is designed as two complete combustion systems to facilitate maintenance, as well as to conserve energy during low use periods. One oxygen train 102 and one exemplary natural gas fuel train 104 are shown in FIG. 3.

Figure 11:
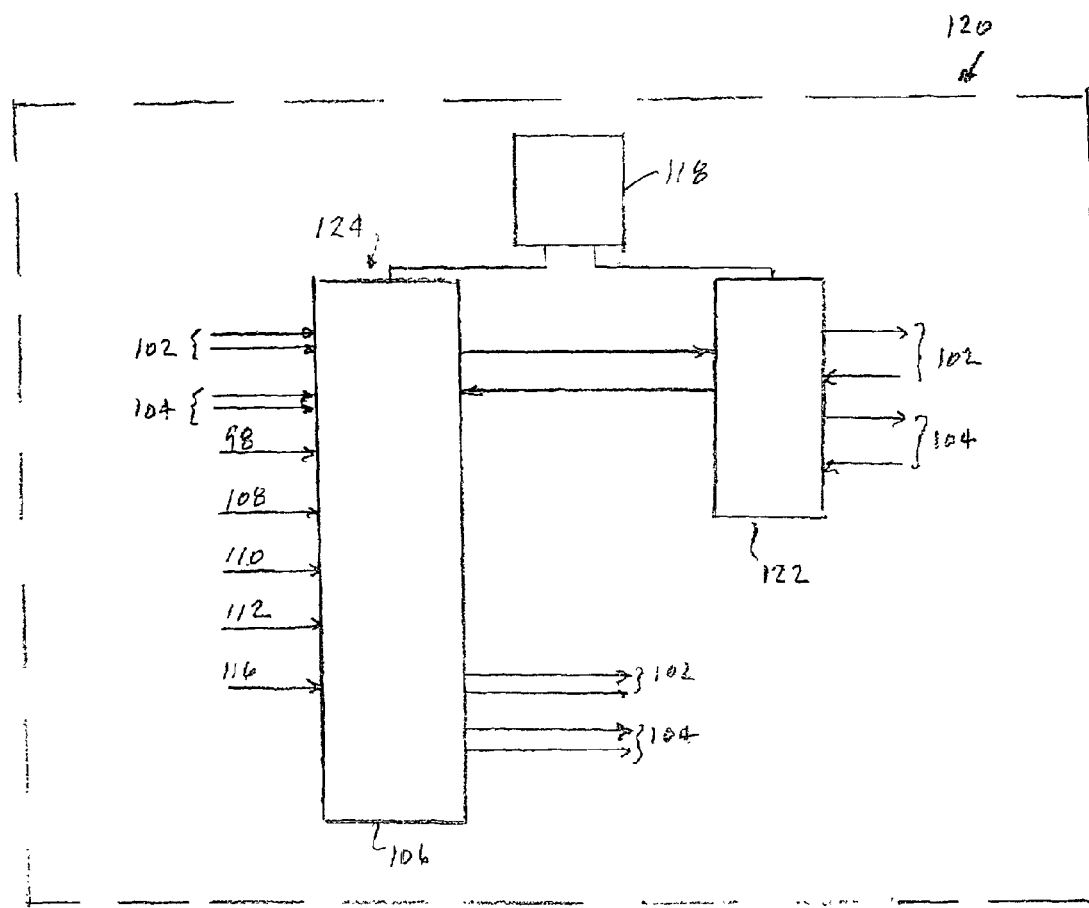
FIG. 11 is a schematic illustrations of an exemplary control system for use with an oxygen fueled combustion system of the present invention

The combustion system 100 is controlled by a control system (illustrated in FIG. 11, indicated generally at 120) that includes a central processing unit ("CPU") 106 that monitors all data inputs from metal temperature, air temperature, fuel and oxygen flow, and provides an operator interface. Each combustion train can be operated individually or in tandem based on operating conditions and requirements.

The main process input variable used to control the combustion system 100 is the metal bath temperature as measured by a thermocouple 108. Alternative process input variables include signals from one of several air temperature sensors 98, 110. The control scheme includes inputs from thermocouples (type K) located in the furnace upper wall, exhaust stack and furnace roof, indicated generally as inputs 112. The primary thermocouple 108 is located in the molten metal bath are 60. The air thermocouples 112 are sheathed with alumina or like materials to protect the measuring element from the atmosphere. The bath thermocouple 108 is protected from molten metal by a ceramic sheath that is resistant to heat and to the corrosive conditions found in molten metal. The bath thermocouple 108 is configured to signal initiation of the burner system only when the metal bath temperature falls below a preset level.

The stack thermocouple or the roof thermocouple 116 is designed for over temperature protection. This thermocouple 116 is connected to an over-temperature circuit that shuts down the combustion trains 102, 104 to protect the refractory and furnace 14 structure in the event that an over temperature limit is reached.

The upper wall thermocouple 98 is primarily used to monitor the furnace 14 air temperature. It can also be used to operate the furnace 14 in the absence of the molten bath thermocouple 108. The upper wall thermocouple 112 is also used as the process input variable when metal is first being charged in the furnace 14 or when the level of molten metal drops below the molten bath thermocouple 108.

An operator has full control over individual temperature set points. A control panel 118 includes temperature indicators for all of the thermocouples 92, 108, 110, 112, 114, 116. The operator can adjust each thermocouple set point until operation limits are achieved. The operational set point limits can be internally set within the CPU so that any desired temperature range can be established.

The combustion system control system 120 is configured in two parts. The first part 122 includes hard wired safety devices, such as relays, limit switches and the like, as will be recognized by those skilled in the art. These include all gas pressure switches, shut off and blocking valves, and flame detectors. The second part 124 of the control system 120 is monitoring and automatic control functions carried out by the CPU 106.

The gas trains 104 are configured in pairs so that one train can be in service while the other is out of service for, for example, maintenance or low-load/use periods. Each gas train 104 is appropriately sized vis-à-vis oxygen flow requirements. Each gas train 104 commences at a ball-type shut off valve 130. Piping 132 routes the gas through a strainer 134 to remove any debris present in the line. A gas pilot line 136 extends from the piping 132 after the strainer 134.

A backpressure regulator 138 is used to lower the header pressure. Presently, the oxygen pressure is set at about 18 pounds per square inch (psig). A shut off valve 140 and safety valves 142 follow in line. A differential pressure flow meter 144 is located downstream of the safety valves 142. The flow meter 144 measures the temperature and differential pressure of the gas as it flows through an orifice 146. A present flow meter 144 is a Rosemount model 3095 differential pressure flow meter.

Through these measurements a flow rate is determined and a signal is transmitted to the control system 120. A control valve 148 is in line following the flow meter 144. In a present arrangement, a modulating control valve is used that receives an output signal from the control system 120. The valve 148 transmits a signal to the control system 120, and specifically, the CPU 106, indicating the actual valve 148 position.

The gas train 104 then splits into two separate lines 104a,b each having a valve 150a,b. The valves 150a,b are used to balance each burner 84 so that the gas flow is evenly distributed.

The oxygen train 102 is similar to the gas train 104, except that the line sizes and components are larger to accommodate the larger flow rate of oxygen. An exemplary oxygen train 102 is illustrated in FIG. 3, in which those components corresponding to fuel train 104 components are indicated by 200 series number identifiers.

Figure 10:
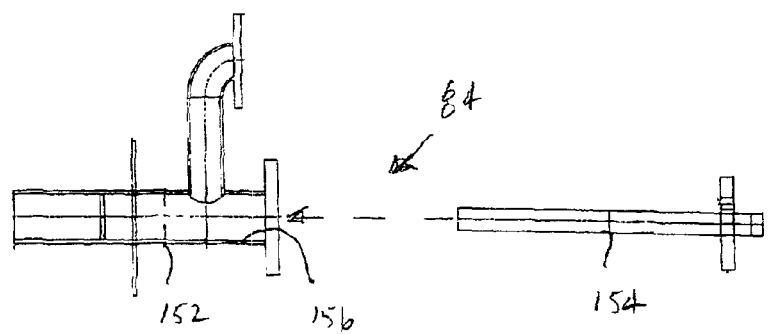
FIG. 10 illustrates a burner assembly for use with the oxygen fueled combustion system.

Referring to FIG. 10, the burners 84 are a fairly straight forward design. Each of the four burners 84 includes a main inlet nozzle body 152 that extends into the furnace 14. A fuel gas inlet 154 extends to the main inlet body 152 external of the furnace wall 54. Oxygen is input to the main inlet nozzle body 152 and mixes with the fuel gas. An igniter (not shown) extends through a central opening 156 in the main inlet body 152. The igniter provides a spark for ignition of the fuel/oxygen mixture.

Operation of the combustion system 100 is readily carried out by a combination of operated initiated action and automatic control by the CPU 106. Power is provided to the system controls which enables the CPU 106 and the hard-wired safeties portion 122 of the control system120. The CPU 106 initiates communication with the control valves, thermocouples, and relays that are part of the hard-wired safeties portion 122. The gas and oxygen pressure switches are of a dual hi/low switch design. The low-pressure switch is a normally closed signal while the high-pressure side is a normally open signal. The CPU 106 determines whether a the proper signal is present and allows the program to continue. If an improper signal is recognized, audible and visual alarms are actuated. The control scheme also monitors whether the gas and oxygen control valves 148, 248 are in the "low-fire" position. If the control valves 148, 248 are in the proper position, a signal is transmitted that allows the control system 120 to continue the startup procedure. An over-temperature signal must also be clear to allow the system 120 to continue through the start up procedure.

When all of the startup conditions are met, a nitrogen purge cycle is initiated. Nitrogen is used to purge the furnace 14 of any combustible gases that may be remaining in the furnace 14. The nitrogen purge is timed so that the volume of nitrogen through the furnace 14 is about 2.5 times the volume of the furnace 14.

After the purge is complete, one or both of the combustion trains is started. A control switch places either a pair of burners or all of the burners 84 into operation. A flame controller opens the pilot solenoids. The pilot solenoids are normally closed, however, upon starting, the solenoids are opened and gas and oxygen flow through a pilot assembly.

At the tip of the pilot assembly the gases mix and are ignited by a spark emitted controlled by the flame controller. Upon ignition, a flame detector 126 detects the presence or absence of flame and transmits a signal to the control system 120. Once a flame is detected, the control system 120 opens the main blocking valves for both the gas and oxygen.

The main fuel and oxygen shut off valves 140, 240 operate independently. The safety valves 142, 242 are configured such that if the gas valve 140 does not open, the safety valves 142, 242 do not open. When the main gas valve 140 opens, the gas and oxygen safety valves open 142, 242. With all of the main valves open, a control relay is energized as well as an indicator light for each gas train on the control panel 118. A pilot timer remains energized for a preset time period, about 30 seconds. Once the preset time duration has elapsed, the pilot circuit is de-energized and the normally closed solenoid valves are de-energized, isolating the pilot assemblies and the pilot indicator light for each burner train.

The flame detectors 126 continuously monitor the flame. Upon loss of flame indication, an alarm signal is transmitted to the CPU 106 and the control circuit isolates the gas and oxygen shut off valves 140, 240 and blocking valves 142, 242.

Once the pilots are de-energized, furnace automatic operation is assumed by the control system 120. While the system 120 is set to "low fire", the oxygen control valves 248 are maintained in the closed position regardless of process and set point values. The gas control valves 148 are not limited in their range since gas flow follows oxygen flow. The control system 120 maintains the gas at the preset ratio.

When operating in the automatic mode, the control system 120 responds to deviations from the process and set point values. Furnace temperature is monitored and matched to the temperature set point. When the process temperature deviates from the set point temperature, an error signal is generated, and the control system 120 transmits a signal to the oxygen control valve 248. The gas control valve 148 is also controlled by the control system 120; the set point variable follows the (stoichiometrically correlated) flow rate of oxygen as established by the oxygen flow meter. The control system 120 is configured to limit the control valves 148, 248 that, in turn, limit the output power of the burners 84.

The combustion system 100, and specifically the control system 120 can be configured to meet any desired application for and in any industry that relies on carbon based fuels. For example, in the present scrap aluminum processing plant 10, there are three applications or uses of the oxygen fueled combustion system 100. The first is for melting aluminum in a high production environment (i.e., in the melting furnace 14). Second, the system 100 is present in the holding furnace 16 primarily for steady state temperature and alloy mixing of the molten aluminum. The last application is in a dross-melting furnace 166 in which high temperature burners are used to release the metal units (aluminum which can be recovered for production) from the dross D (melt byproduct) by thermal shock. In each use, the burners are installed for energy conservation and environmental reasons.

Applications of the present combustion system 100 vary by thermal output (measured in maximum MMBTU per hour), size and orientation of the burners 84, as well as the temperatures at which the furnaces 14, 16, 166 are designed to operate. Those skilled in the art will recognize that mechanical differences (e.g., line sizes and the like) are needed to accommodate these differing needs, and that the specific programming of the control system 120 and CPU 106 may vary.

The present combustion system 100 provides a number of advantages over known and presently used combustion systems. For example, it has been shown through operation that there is considerable energy savings using the present combustion system 100. The oxy-fuel burners 84 operate at a much higher temperature than conventional furnaces. Thus, there is an observed increase in the heat available for melt (in other industrial applications, this increased heat can be made available for, for example, steam generation, refuse incineration and the like). This provides a reduction in the amount of fuel required to operate the furnaces 14, 16, 166. In practice of the present invention, it has been observed that the average (and estimated) thermal input required per pound of aluminum melted is decreased from about 3620 BTU per pound (in a conventional furnace) to about 1083 BTU per pound in the melting furnace 14. This is a decrease of about 70 percent. In addition, the fuel needed to maintain temperature in the holding furnace 16 has been shown to be about one-half of that of a conventional furnace.

It is believed that the fuel savings is attributed to three principal factors. First, the increased heat of the combustion system 100 permits complete burn of all fuel without excess oxygen. Second, being held to theory, it is believed that the combustion system 100 operates within a radiative (or radiant) heat transfer zone, with some heat transfer by conduction.

The system 100 is designed to take advantage of the radiant heat transfer within the furnaces 14, 16, 166 to transfer heat effectively to the metal baths. Third, because there is no nitrogen in the combustion process, the amount of gas flowing through the furnaces 14, 16, 166 is low. Thus, an increased residence time of the hot gases permits the release of a larger proportion of energy (in the form of heat) prior to exhaust from the furnaces 14, 16, 166.

Typical exhaust gas volume is fractional of that of conventional furnaces. In that there is about 80 percent less gases (essentially the nitrogen component of air) in an oxy-fueled furnace, combustion efficiency is greatly increased. In conventional furnaces, the nitrogen component of air absorbs much of the energy (again, in the form of heat) from the melt. In the present combustion system 100, oxygen (rather than air) and fuel are fed to the furnaces 14, 16, 166 and burned in a stochiometric ratio. This is carried out without excess oxygen. Thus, there is no energy absorbed by non-combustion related materials e.g., excess oxygen or nitrogen).

The present combustion system 100 also provides for increased production. When installed as part of a melting furnace, the melting capacity or throughput of the furnace will be increased. This again is attributed to the rapid and effective heat transfer in the furnace 14. As new metal is introduced into the furnace 14, the combustion system 100 responds rapidly to provide heat to melt the fed metal and to maintain the heat (temperature) of the molten metal in the pool 60 at the set point temperature. It has been found that aluminum accepts heat very efficiently from a radiative heat source.

Perhaps most importantly, is the reduced environmental impact of the present combustion system 100, compared to presently known and used combustion systems. The present system 100 advantageously uses no nitrogen (from air) in the combustion process. Typically, NOx production occurs in a furnace as a reaction product of the heated air that is fed by the combustion system. However, in that the present system 100 uses oxygen, rather than air, any NOx produced by the present combustion system is due solely to the amount of elemental nitrogen that is in the fuel (i.e., fuel-borne nitrogen). In that fuel-borne nitrogen levels are extremely low (compared to that contributed by air in conventional furnaces), the NOx levels of the present combustion system are well below any industry standards and governmental limitations. In addition to reducing NOx production, the production of other green-house gases, such as carbon monoxide, is also greatly reduced.

In addition, to the reduced environmental impact, the present oxy fuel combustion system conserves energy because significantly more aluminum can be processed at considerably less fuel input (any carbon based fuel, including coal, coal dust, natural gas or oil). As a result of processing with less fuel usage, conservation of fuel resources is achieved. Essentially, less fuel is used in the aggregate, as well as on a per pound basis to produce aluminum. This reduces processing (e.g., fuel) costs, as well as the taxing use of fossil fuels.

Oxygen Supply

As will be recognized by those skilled in the art, the oxygen requirements for the present combustion system 100 can be quite high. To this end, although oxygen can be purchased and delivered, and stored for use in the system, it is more desirable to have an oxygen production facility near or as part of an oxy fuel combustion system, such as the exemplary scrap aluminum processing plant.

Referring now to FIG. 4, there is shown a cryogenic plant 180 for use with the present combustion system 100. The illustrated, exemplary cryogenic plant 180 produces 105 tons per day of at least 95 percent purity oxygen and 60,000 standard cubic feet per hour of nitrogen having less then 0.1 part per million oxygen. The plant 180 includes a 1850 horsepower three-stage compressor 182. The compressed air, at 71 psig enters a purifier/expander 184. The air exits the expander 184 at a pressure of 6.9 psig and a temperature of −264° F., and enters a cryogenic distillation column 186. In the column 186, air is separated (distilled) into gaseous nitrogen, liquid nitrogen, gaseous oxygen and liquid oxygen. The gaseous oxygen, indicated generally at 188, is fed directly to the combustion system 100 and the liquid oxygen, indicated generally at 190, is stored for example in tanks 191, for later use for in the combustion system 100. The oxygen pressure from the cryogenic plant 180 may be lower than that required for the combustion system 100. As such, an oxygen blower 192 is positioned between the oxygen discharge from the column 186 and the combustion system 100 feed to raise the pressure to that need for the combustion system 100.

The gaseous nitrogen, indicated generally at 194, is fed to a downstream annealing/stress relieving system (not shown) within the plant 10. These systems, which use nitrogen to treat aluminum to relieve stresses in the metal and to anneal the metal, will be recognized by those skilled in the art. In addition, the nitrogen 194 is used in the degassing units 24. The plant 10 also includes a back up supply of oxygen and nitrogen 191, 196, respectively, in liquid form in the event of, for example, maintenance or other situations in which the cryogenic plant 180 cannot supply the plant requirements. The back-up systems 191, 196 are configured to automatically supply oxygen and/or nitrogen as required, such as when the cryogenic plant 180 is off-line. Excess nitrogen can be stored, bottled and sold. Systems such as these are commercially available from various manufacturers, such as Praxair, Inc. of Danbury, Conn.

Heat Recovery

The aluminum processing system 10 also takes advantage of waste heat from the various processes. Specifically, the processing plant 10 can include a waste heat recovery system, indicated generally at 200 in FIG. 4. Exhaust gas, indicated at 202, from the melting furnace 14 and the holding furnace 16 is directed to one side of a waste heat recovery heat exchanger 204. In that the exhaust gas 202 is at a temperature of about 1000° F., there is a considerable amount of energy that can be recovered. In addition, energy can be recovered from the exhaust above as the main furnace bath area 60.

The exhaust gas 202 is directed to the waste heat exchanger 204. A working fluid, indicated at 206, such as pentane, flows through the other side of the heat exchanger 204 under pressure. It is anticipated that a plate-type heat exchanger or a plate-and-tube type heat exchanger is best suited for this application. Those skilled in the art will recognize the various types of working fluids that can be used for the present waste heat recovery system, as well as the heat exchange systems that are used with these types of working fluids. All such systems are within the scope and spirit of the present invention.

The heated fluid 206 is then directed to a vaporizer 208 where the fluid 206 is allowed to expand into vapor. The vapor 206 is directed to a turbine-generator set 210 to produce electricity. The vapor is then condensed, in a condenser 212, and returned to the heat exchanger 204. It is anticipated that sufficient energy to produce about 1.5 to 2.0 megawatts of power in the form of electricity can be recovered from the exhaust gas 202 from the above-described scrap processing plant 10.

Although a wide variety of working fluids 206 can be employed for use in such a waste heat or waster energy recovery system 200, in a presently contemplated system, pentane is used as the working fluid 206. Such an organic based system provides a number of advantages over, for example, steam-based systems. It is anticipated that a pentane-based working fluid 206, in a standard Rankine-cycle arrangement will allow for variations in vapor supply more readily than a steam-based system. In that the heat output from the furnaces (melting 14 and holding 16) is dependent upon metal production, rather than electrical needs, the energy input to the recovery system 200 is likely to vary and will be the controlling characteristic for power production. As such, a fluid 206 such as pentane provides the greater flexibility that is required for such a recovery system 200.

As will be recognized by those skilled in the art, the electrical power generated can be used to provide some of the power necessary for the scrap processing plant 10, including the cryogenic plant 180. Power for operating the plant 10 can be provided by an oxy fueled combustion system employed in an electric power generating plant (using a furnace or boiler), to generate steam for a steam turbine-generator set. In such an arrangement, when the power generated exceeds plant 10 requirements, the excess power can be sold to, for example, a local electric utility.

Dross Processing

Referring now to FIG. 2, the contaminants or dross D from the melting furnace 14 is further processed, separate and apart from the in-line aluminum recovery in a dross recovery process, indicated generally at 164. The dross D is removed, as by skimming, from the top of the molten aluminum pool 60 in the melting furnace 14. The dross D is pressed in a sieve-like bowl 168 by mechanical means. Pressing pushes the aluminum A from the dross D, through openings 170 in the bowl 168. The aluminum A that is pressed from the dross D is recovered and is returned to the melting furnace 14.

The oxide laden dross is fed into the recovery furnace 166 for reheating. The recovery furnace 166 is of a similar design to the melting furnace 14 in that it uses an oxy-fuel combustion system 100 design. In operation, however, the recovery furnace 166 "shocks" the dross laden material by using near direct flame impingement of about 5000° F. to release the aluminum metal from the dross D. The molten bath 172 temperature in the recovery furnace 166 is also considerably higher, about 1450° F.–1500° F., with a furnace air temperature of about 2000° F.–2200° F. In addition, the "shocking" process is carried out in a highly reduced atmosphere with substantially no excess oxygen within the furnace 166 (in contrast to conventional furnaces that operate at excess oxygen levels of about 3 to 5 percent).

The recovery furnace 166 is likewise skimmed and the resulting dross is pressed. The recovered aluminum A is transferred to the melting furnace 14. The remaining dross D2 is then sent for processing off-site, to a dross processor, for further aluminum recovery. It has been found that the present process, including the dross recovery process, provides a significant increase in the recovery of metal. The dross D2 that is ultimately shipped for further processing is only a fraction of the original quantity of dross D, thus reducing processing costs and increasing aluminum recovery.

Importantly, the present dross recovery process 164 is carried out without the use of salts or any other additives. Rather, thermal shocking is used to release the metal from the oxides. Known recovery processes use salts to separate the oxides from the metal. In that the salts remain in the oxides, which are in turn disposed of, ultimately, the salts are likewise sent for disposal. These salts can be environmental hazards and/or toxic. As such, the present process 164 is environmentally beneficial in that it eliminates the need for these salts and thus their disposal.

As to the overall processing scheme 164, again, it has been found that the present recovery steps (e.g., double pressing with intermediate reheating) result in aluminum recovery rates that are significantly improved over those of known processes, depending upon the grade of the scrap. Multi-percent increases in the amount of metal recovered from the dross D have been achieved.

Other Applications for the Combustion System

As discussed above, it is apparent that increased efficiencies from the use of oxygen in all continuous processes can be achieved. For example, power generating plants can increase flame temperature or reduce LOI in boilers by introducing oxygen to the burning formula (rather than air). This can increase efficiencies in operation. Essentially, burning of any carbon based fuels can be enhanced by the introduction of oxygen. The benefits are both economical and environmental. To date no industry other than glass-making has embraced oxy fuel technology. In the glass making industry this technology is used not for the efficiencies that result, but because of the high melting temperature required for the glass production process.

Nevertheless, use of oxy-fueled combustion systems in all industrial and power generating applications can provide reduced fuel consumption with equivalent power output or heat generation. Reduced fuel consumption, along with efficient use of the fuel (i.e., efficient combustion) provides greatly reduced, and substantially zero, NOx emissions and significant reductions in the emission of other green-house gases.

Due to the variety of industrial fuels that can be used, such as coal, natural gas, various oils (heating and waste oil), wood and other recycled wastes, along with the various methods, current and proposed, to generate oxygen, those skilled in the art will recognize the enormous potential, vis-à-vis industrial applicability, of the present combustion system. Fuel selection can be made based upon availability, economic factors and environmental concerns. Thus, no one fuel is specified; rather a myriad, and in fact, all carbon based fuels are compatible with the present system. In addition, there are many acceptable technologies for producing oxygen at high purity levels. Such technologies includes cryogenics, membrane systems, absorption units, hydrolysis and the like. All such fuel uses and oxygen supplies are within the scope of the present invention. Those skilled in the art will recognize that the other gases produced, such as hydrogen and nitrogen, can be stored, bottled and sold.

As discussed in detail above, one application for the present combustion is scrap aluminum processing or recovery. Other exemplary applications, as will be discussed below, include industrial power generation boilers and incinerators. These exemplary applications focus on the flexibility and applicability of this technology for broad industrial uses.

In general, the use of oxygen fuel fired combustion over current or traditional air fuel systems offers significant advantages in many areas. First is the ability to run at precise stoichiometric levels without the hindrance of nitrogen in the combustion envelope. This allows for greater efficiency of the fuel usage, while greatly reducing the NOx levels in the burn application. Significantly, less fuel is required to achieve the same levels of energy output, which in turn, reduces the overall operating costs. In using less fuel to render the same power output, a natural reduction in emissions results. Fuel savings and less emissions are but only two of the benefits provided by the present system.

Steam generators for the production of electricity, e.g., by industrial power boilers, are varied but are nevertheless fundamentally dependent upon their combustion systems to produce steam to turn a turbine-generator set. The fuels used vary based upon the design of the steam generators. However, all of the boilers require an oxidizing agent. Using the present oxy fuel combustion system, high purity oxygen is used as the sole oxidizing agent throughout the boiler or is used as a supplement to air providing the oxygen for combustion.

The benefits that can be enjoyed by other industrial applications hold-true for the power industry. For example, the use of oxygen within the combustion zone enhances flame temperature while effectively cutting LOI (loss on ignition) by providing readily available oxygen for combustion. By increasing flame temperatures, greater rates of steam generation can be accomplished with the same fuel burn rate. Conversely, equal power generation or output can be recognized with lower fuel burn rates. Flame temperature will be dependent upon the concentration of the oxygen provided for combustion. To this end, with no oxygen supplementation or enrichment (i.e., pure air for combustion), flame temperatures will be about 3000° F. Referring to the above discussion, with pure oxygen as the oxidizing agent, the flame temperature will be about 4500° F. to about 5000° F. The anticipated flame temperatures for varying degrees of oxygen supplementation can be interpolated (it is believed linearly) between these temperatures.

Oxygen can also be used in conjunction with over-fired air systems or lox NOx burners to reduce NOx and other green-house gases while ensuring stable flame at stoichiometry. Typical low NOx burners often increase LOI. This requires operators to burn more fuel. By adding enriched oxygen to the combustion process complete burn becomes available for fuel while at stoichiometry without additional nitrogen present (by additional air input) to create NOx.

It is anticipated that boilers will be designed around oxygen fueled combustion systems to take full advantage of the benefits of these systems. It is also anticipated that retrofits or modifications to existing equipment will also provide many of these benefits both to the operator (e.g., utility) and to the environment.

Figure 12:
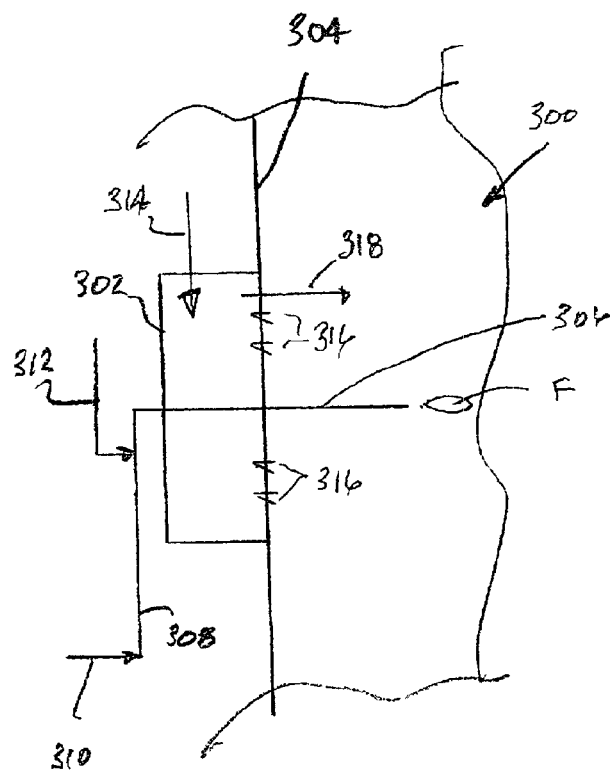
FIG. 12 is a schematic view of an exemplary power boiler or furnace front wall illustrating a burner and an air feed arrangement, and showing the incorporation of an oxy fuel combustion system therein embodying the principles of the present invention.

For example, FIG. 12 illustrates, schematically, a coal fired boiler or furnace 300. A wind box 302 is formed at a wall 304 of the furnace 300. A burner 306, through which the coal is introduced into the furnace 300, extends through the wind box 302. The coal is carried to the furnace 300 by a coal conduit 308. Primary air (as indicated at 310) is supplied to carry the coal (from a pulverizer, not shown) through the conduit 308 and burner 306 into the furnace 300. Tertiary air (as indicated at 312) is provided to the coal conduit 308 to assure that the coal is conveyed to the burner 306.

Secondary air (as indicated at 314) is provided from the wind 302 directly into the furnace 300 through registers 316 on the furnace wall 304. The secondary 314 air is the primary source of air for the combustion process. In one well recognized and known system for controlling NOx, an over-fired air system (as indicated at 318) injects air (from the wind box 302), into the furnace 300 over the flame F. The underlying purposes for the over-fired air are two-fold. First is to provide sufficient oxygen to assure complete combustion of the fuel. Second is to reduce the flame temperature and thereby reduce the production of NOx.

It is anticipated that the present combustion system can replace existing combustion systems, in total, or, in the alternative, can be used to provide an oxygen supplement to the air used for combustion. Specifically, it is anticipated that high purity oxygen can be used in place of any or all of the primary 310, secondary 314 and tertiary air 312 that is used in these known combustion systems. Those skilled in the art will recognize the benefits that can be obtained using the present oxy fuel combustion system (or as in certain applications oxygen supplementation system) in power boilers or furnaces that use other fossil fuels, such as oil or gas.

Use of the present combustion system is also contemplated for use in connection with industrial waste incinerators. Typical waste incinerators operate on the basis of resonant time, temperature and excess oxygen. An oxy-fuel system will allow for greater efficiency in the operation.

Resonant time is dependent upon the physical size of the heated chamber or stack, and the velocity and volume of gases passing through the chamber or stack. As nitrogen is taken out of the mix the resonant time naturally increases because the volume of gas used in the combustion process is less (by about 80 percent). When an incinerator is specifically designed with an oxy-fuel combustion system, the incinerator requires considerably less capital cost because of the reduced size that is required.

Typical flame temperatures of oxy-fueled combustion systems are much higher then air fueled systems. Thus, the efficiency of the burn ultimately requires less thermal input from the fuel, resulting in less operating costs. One of the benefits of the oxy-fuel combustion system is the control over excess oxygen levels that is achieved. In the case of conventional incinerators, excess oxygen is required to burn the volatile organic carbons (VOCs) and unburned carbon. This excess oxygen is provided by injecting air into the chamber or stack where the oxygen (from the air) is used to complete the burn of VOCs and unburned carbon. Although air provides the necessary excess oxygen, it also permits nitrogen into the chamber. The excess nitrogen that is introduced (to provide the excess oxygen) results in increased production of NOx. Additionally, the excess air, overall, results in the generation of other green-house gases, and further acts to cool the chamber. This undesirable cooling then requires additional heat from the combustion system to overcome this cooling effect.

Figure 13:
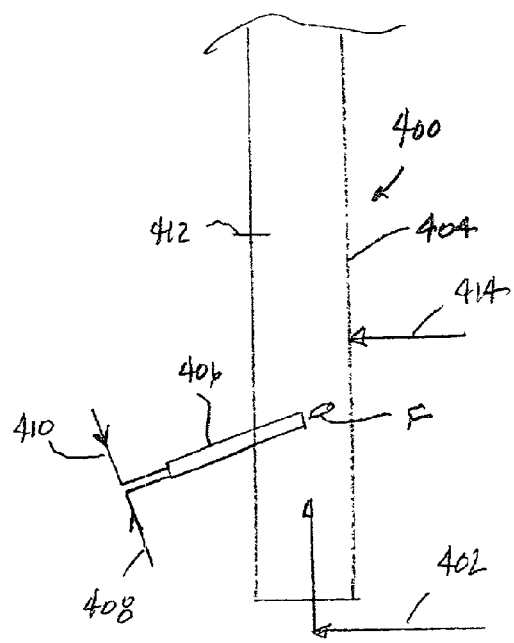
FIG. 13 is a schematic illustration of a waste incinerator showing the incorporation therein of an oxy fuel combustion system embodying the principles of the present invention.

FIG. 13 illustrates, schematically, a typical industrial furnace 400. Waste (as indicated at 402) is introduced into a stack 404. A burner 406 is fed with air (as indicated at 408) and fuel (as indicated at 410) to produce a flame F. to incinerate the waste 402. A carbon monoxide (CO) monitor 412 is located above the flame F. to determine the level of CO in the exhaust gas. When the level of CO is too high, additional air is fed to the burner 406. Optionally, air can be fed into the stack from a location 414 apart from the burner 406 to provide the additional air.

There are a number of drawbacks to this method of operation. As discussed above, the two controlling factors in waste incineration are time and temperature. That is, higher temperatures and greater resonant times increase the incineration of the waste. However, the addition of air (to reduce CO levels) increases the flow rate through the stack 404 thus reducing the resonant time. In addition, although the increased air flow reduces flame temperatures (which in turn reduces NOx production), it also introduces high levels of nitrogen, which tends to increase NOx production and offset the cooling (and reduced NOx production) effect. Moreover, because of the cooling effect of the air, the efficiency of the incineration process is reduced.

The present oxy-fuel combustion system, on the other hand, uses high purity oxygen which permits burning the unburned material without the production of NOx and other green-house gases and without cooling effects. The present oxy-fuel system thus affords several advantages over conventional or traditional incinerator systems. In that the primary duty of an incinerator is to burn VOCs and other contaminants before they reach the atmosphere, the present combustion system reduces the fuel used and thus results in reduced production of NOx and other green-house gases, and a reduced volume of flue gases generally.

In addition, the installation (e.g., capital) and operating costs of incinerators employing oxygen fueled combustion systems will be greatly reduced. The capital cost of the incinerator will be reduced because the volume of gases through the system is expected to be much lower. As provided above, because the throughput of gas is much less, the overall size of the incinerator can be considerably less than conventional systems while maintaining the same resonant time. Thus, the incinerator can be physically smaller to handle the same waste load, and the required support systems and ancillary equipment and systems can likewise be smaller.

In addition, oxy-fueled combustion systems are generally considerably more efficient than conventional incinerator systems and require a fractional amount of the required energy input. The system also lends itself quite well to incinerator applications in which the fuel is unburned carbon or VOCs. Likewise since there is no nitrogen present in the flame envelope the development of NOx is kept to a minimum, relegated to NOx formed from fuel-borne nitrogen only.

The industries described above are only a few exemplary industries that can benefit from the use of the present oxy fuel combustion system. Those skilled in the art will recognize the applicability of this system in the chemical and petro-chemical industries, the power generation industry, plastics industries, the transportation industry and the like.

Oxy Fuel Combustion—The Benefits and Advantages

The benefits and advantages of oxy fuel combustion will be appreciated by those skilled in the art. Nevertheless, in an exemplary aluminum scrap processing facility, using an air-fired furnace outfitted for natural gas, it was found that the energy required to process or melt one pound of scrap aluminum (as determined by the cubic feet of natural gas used), was 3,620 BTUs (presented as 3,620 BTUs/lb). That is, about 3.45 standard cubic feet (SCF) of natural gas was need to melt each pound of aluminum. The energy requirement of 3,620 BTU is based upon each SCF of natural gas having a heat content of 1,050 BTUs.

In contrast, using the present oxy fueled combustion system, it was found that only 1.03 SCF of natural gas (or 1083 BTUs) was needed to melt each pound of aluminum. Thus, the present oxy fuel combustion system used 1083BTU/3620BTU or 29.9 percent of the fuel required for an air-fired furnace. This is a reduction of 1.0 less 0.299 or about 70 percent in the fuel consumption.

Similar though not quite as drastic reductions in fuel consumption have been observed with an oxy fueled combustion system that uses waste oil as a fuel. It was found that the heat content of the waste oil fuel need to melt each pound of aluminum was 1218 BTUs. Thus, the reduction observed with waste oil was 1218/3620 or 33.6 percent, resulting in a reduction in fuel consumed of about 66 percent. As such, even before considering the reduction in pollutants produced, the present oxy fuel combustion system exhibited reductions in fuel consumption of about 70 percent and 66 percent using natural gas and waste oil, respectively, over an air-fired, natural gas fired furnace.

Table 1, below illustrates a comparison of the pollutants produced using an air-fired (gas fueled, shown as "AIR-GAS") combustion system, an oxy fueled (gas, shown as "OXY-GAS") combustion system and an oxy fueled (waste oil, shown as "OXY-OIL") combustion system. The pollutants shown are carbon monoxide (CO), gaseous nitrogen compounds (NOx), particulate matter under 10 microns in size (PM10), total particulate matter (PT), sulfur containing gaseous compounds (SOx) and volatile organic carbon compounds (VOC).

The data is shown in two forms, namely, tons per year produced (TPY) and pounds produced per million BTUs used (lbs/MMBTU). The parentheticals following the OXY-GAS and OXY-OIL data represent pollutant reductions over those of the air-fired, gas fueled combustion system.

TABLE 1

FLUE GAS ANALYSIS FOR AIR-GAS, OXY-GAS AND OXY-OIL COMBUSTION SYSTEMS

| | AIR-GAS | | OXY-GAS | | OXY-OIL | |
|---|---|---|---|---|---|---|
| Pollutant | TPY | lb/MMBTU | TPY | lb/MMBTU | TPY | lb/MMBTU |
| CO | 4.88 | 2.0E−2 | 1.51 | 6.0E−3 (68.9) | 1.32 | 5.0E−3 (73.0) |
| NOx | 24.38 | 1.E−1 | 0 | 0 (100.0) | 10.04 | 0.041 (58.8) |
| PM10 | .028 | 1.0E−4 | .0023 | 9.4E−6 (92) | 0.146 | 6.0E−4 (−410) |
| PT | .028 | 1.0E−4 | .0023 | 9.4E−6 (92) | 0.169 | 6.9E−4 (−490) |
| SOx | 0.146 | 6.0E−4 | 4.5E−2 | 1.9E−4 (69) | 1.39 | 5.7E−3 (−848) |
| VOC | 0.582 | 2.4E−3 | 4.0E−1 | 1.6E−3 (31) | 3.33 | 1.4E−2 (−471) |

The values for PM10, PT, SOx and VOC for the oxy fueled waste oil combustion system show increases (as negative reductions). This is due in part to no "post-burn" treatment processes used in the exemplary combustion system. It is anticipated that proper "post-bum" processes would include bag houses (for particulate matter) and scrubbers (for sulfur-containing gases) and would result in reductions of at least about 98.99 percent and 95 percent, respectively, in emissions quantities. The values attained in TABLE 1 were based upon the reduction in fuel consumption observed and were determined in accordance with accepted United States Environmental Protection Agency (USEPA) criteria, as determined from USEPA tables AP42 (available from the USEPA website).

It must be noted that the above values are based upon controlling the environment within the furnace in which the oxy fueled combustion system is used. That is, the values shown above that indicate reductions in pollutants for the OXY-GAS and OXY-OIL combustion systems require that the furnace in which the combustion systems are installed is designed to limit to negligible air in-leakage (i.e., nitrogen in the combustion atmosphere).

Thus, as will be appreciated by those skilled in the art, the use of high purity oxygen (or highly oxygen-enriched air) and any carbon based fuel is highly adaptive to many existing industrial systems. It is anticipated that the uses for such a system in standard and conventional industrial applications will provide myriad advantages and benefits over known, presently used air fired and air over-fired systems. Although many present physical plants may require redesign and modification to incorporate the present oxy-fueled combustion systems to enhance performance and production, it is contemplated that the benefits gained by making these changes in design and structure, such as lowered operating costs, e.g., reduced fuel costs, lowered capital costs and reduced emissions, will far outweigh the costs to make these changes.

In the present disclosure, the words "a", or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A waste incinerator configured to substantially prevent the introduction of air for supporting combustion comprising:

a combustion region;
    a burner;
    a fuel supply for supplying a fuel;
    an oxidizing agent supply for supplying oxygen for supporting combustion at a predetermined purity;
    a waste supply; for feeding waste to be incinerated into the combustion region;
    means for feeding the oxygen and the fuel and waste into the incinerator in a stoichiometric proportion to one another;
    means for limiting an excess of either the oxygen or the fuel and waste to less than 5 percent over the stoichiometric proportion; and
    means for controlling the combustion of the fuel and waste and the oxygen to produce a flame for incinerating the waste, the combustion being controlled to produce a flame having a temperature in excess of about 4500° F.

2. The waste incinerator in accordance with claim 1, including a further oxygen injector for injecting oxygen into the combustion region.

3. The waste incinerator in accordance with claim 1 wherein the incinerator is configured so as to substantially prevent the introduction of air.

4. A method for incinerating waste comprising the steps of:
providing a waste incinerator configured to substantially prevent the introduction of air for supporting combustion, the incinerator having a combustion region, a burner, a fuel supply, and an oxidizing agent supply;
supplying a fuel to the burner;
supplying oxygen for supporting combustion at a predetermined purity to the burner;
supplying waste to the combustion region;
feeding the oxygen and the fuel and waste into the incinerator in a stoichiometric proportion to each other;
limiting an excess of either the oxygen or the fuel and waste to less than 5 percent over the stoichiometric proportion;
controlling the combustion of the oxygen and the fuel and waste to incinerate the waste so that the fuel and waste and the oxygen are combusted at the burner to produce a flame for incinerating the waste having a temperature in excess of about 4500° F.; and
incinerating the waste.

5. The method for incinerating waste in accordance with claim 4 including the step of supplying oxygen to the burner having an oxygen concentration of at least about 85 percent.

6. The method for incinerating waste in accordance with claim 4 including the step of injecting oxygen into the combustion region apart from the step of supplying oxygen at a predetermined purity to the burner.

7. A waste incinerator configured to substantially prevent the introduction of air for supporting combustion, comprising:
a combustion region;
a burner;
a fuel supply for supplying a fuel;
an oxidizing agent supply for supplying oxygen for supporting combustion at a predetermined purity;
a waste supply for feeding waste to be incinerated into the combustion region;
means for feeding the oxygen and the fuel and waste into the incinerator in a stoichiometric proportion to one another;
means for limiting an excess of either the oxygen or the fuel and waste to less than 5 percent over the stoichiometric proportion; and
means for controlling the combustion of the fuel and waste and the oxygen to produce a resonant time for the waste in the combustion region that is greater than a resonant time for incineration of the waste in an air-fuel combustion system.

* * * * *